UNITED STATES PATENT OFFICE.

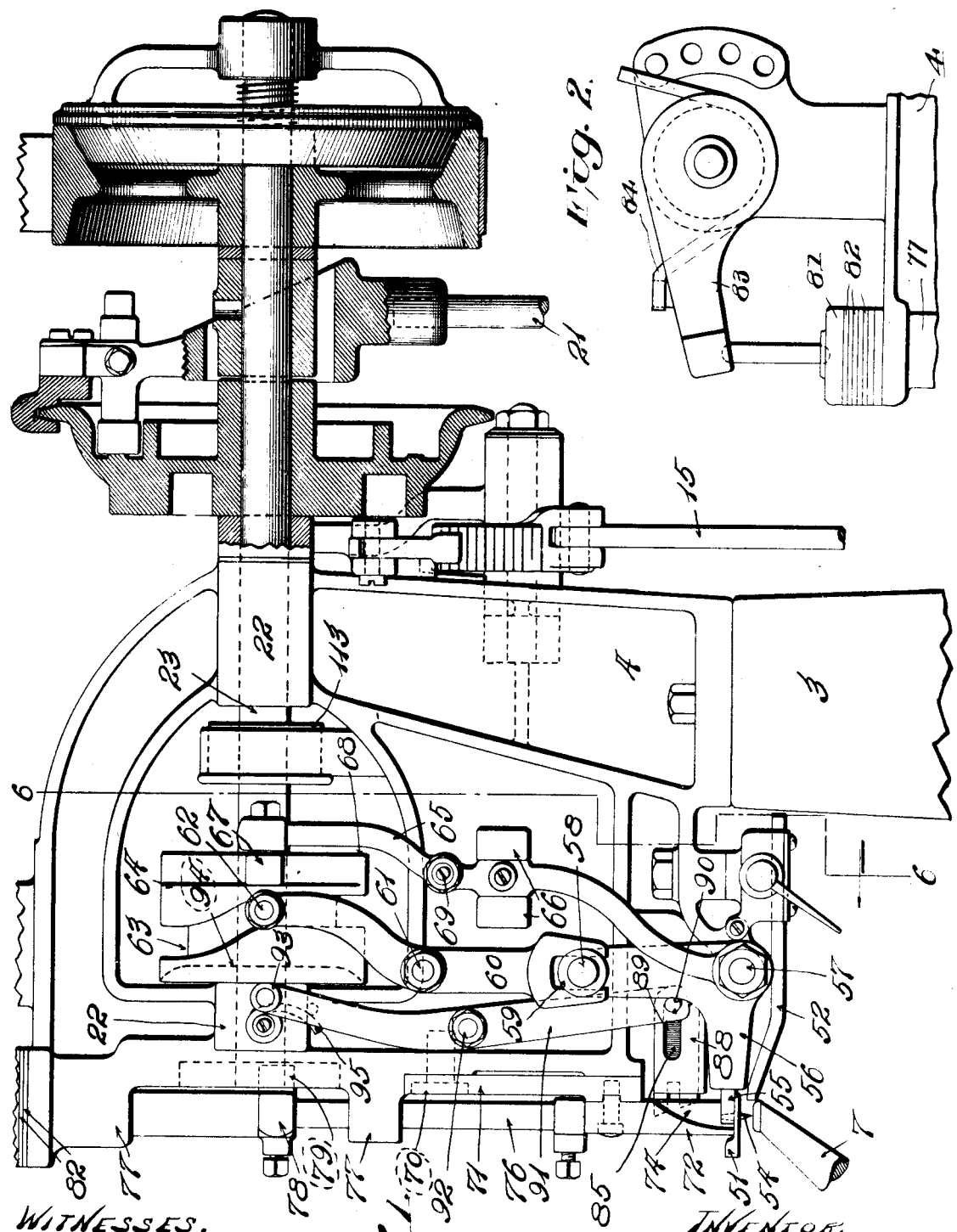

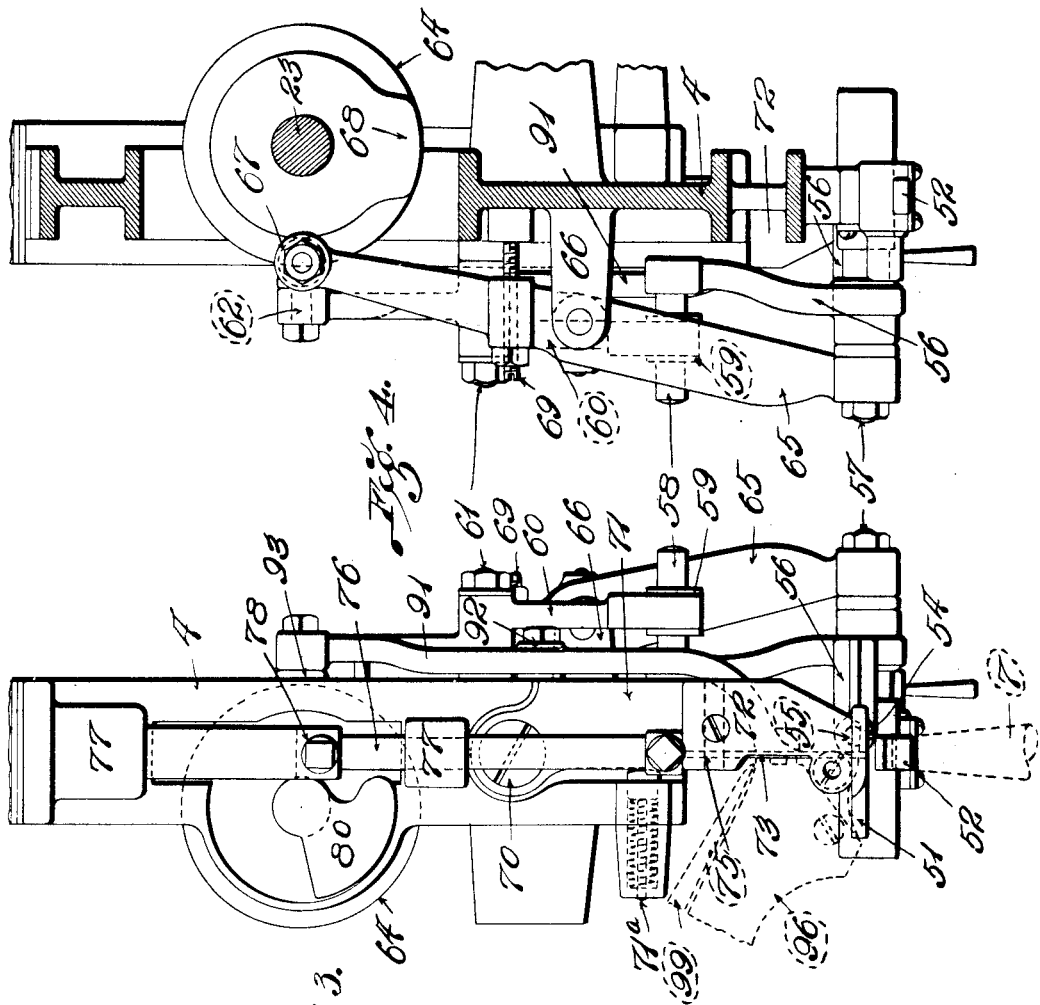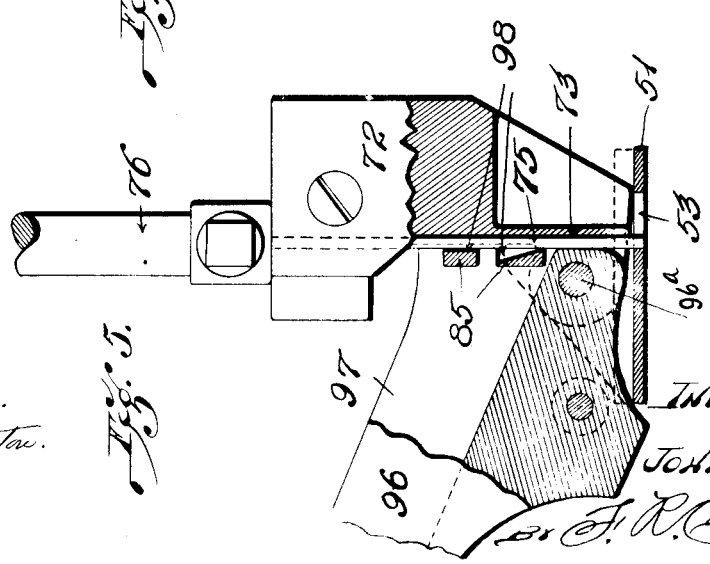

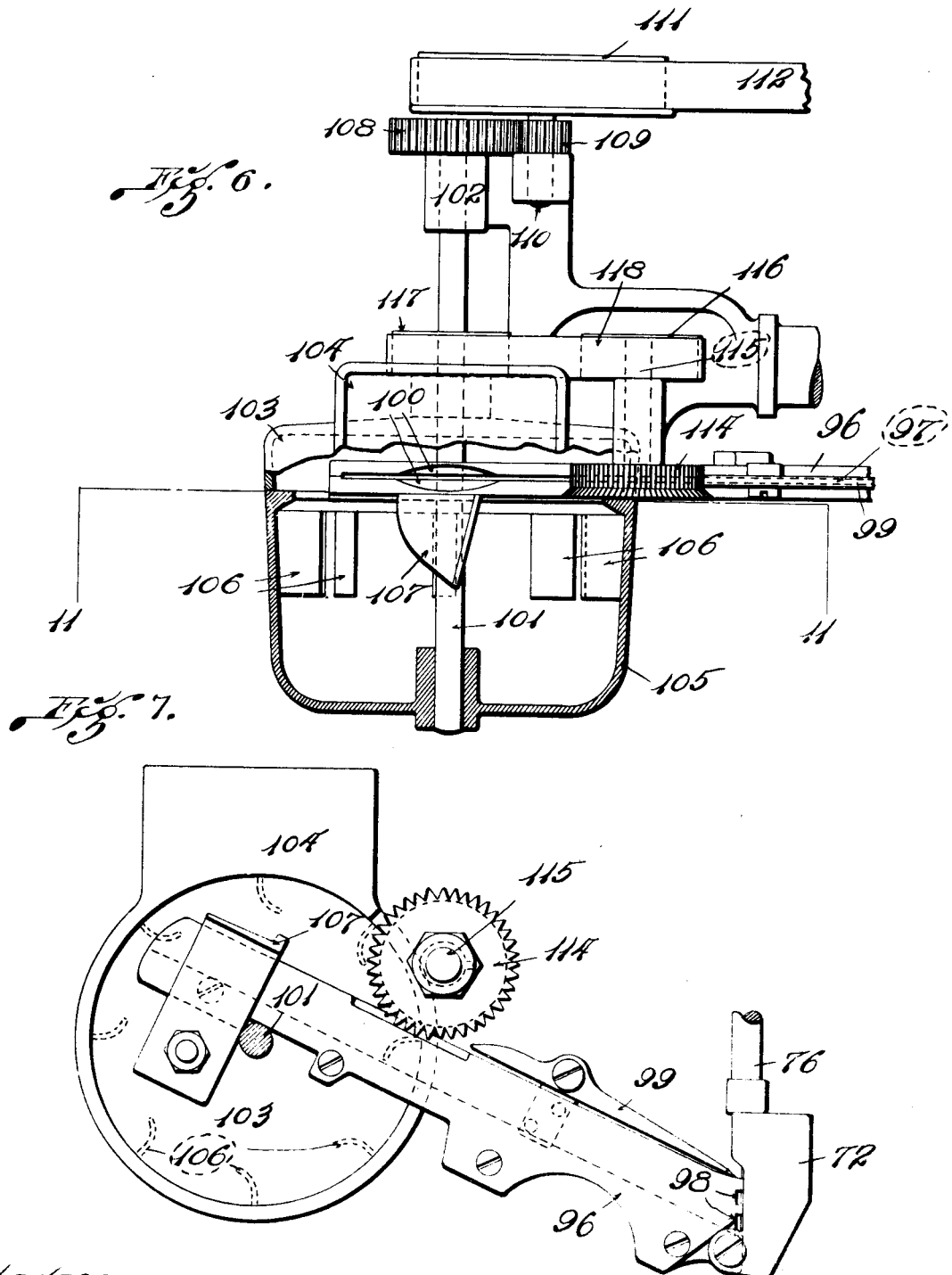

JOHN B. FLINT, OF ST. JOSEPH, MISSOURI, ASSIGNOR TO THE CHAMPION SHOE MACHINERY COMPANY, OF ST. LOUIS, MISSOURI, A CORPORATION OF MISSOURI.

LOOSE-NAILING MACHINE.

1,026,027.  Specification of Letters Patent.  Patented May 14, 1912.

Application filed April 26, 1910. Serial No. 557,642.

*To all whom it may concern:*

Be it known that I, JOHN B. FLINT, a citizen of the United States, residing at St. Joseph, Missouri, have invented a certain new and useful Improvement in Loose-Nailing Machines, of which the following is a full, clear, and exact description, such as will enable others skilled in the art to which it appertains to make and use the same, reference being had to the accompanying drawings, forming part of this specification.

This invention relates to fastener inserting or nailing machines, and more particularly to machines of the type known as "loose-nailing machines."

In nailing machines, especially where they are used for securing two parts together by a row or rows of nails as in securing soles to shoes, or where wear resisting slugs are driven along a sole or heel, means must be provided whereby the work may be fed. Generally this work feeding mechanism comprises an awl which also forms holes to receive the fasteners. This mechanism must be so arranged that the driver will be positioned over the hole or puncture made by the awl, so that the fasteners will be properly positioned and driven therein. Where the driver is stationary this requires that the awl be moved alternately into and out of the line of drive. In prior machines this was accomplished by swinging the entire head carrying all the fastener inserting mechanism; this however caused vibration and wear of parts due to the inertia of the heavy moving parts.

One of the objects of this invention is to construct a machine in which the moving parts will be light, and in which as many of the parts as possible will be stationary or move in stationary guides or supports. This is accomplished by moving the nail throat into and out of the line of drive during the feeding operation, leaving the driver supported in stationary guides. The throat will thus be moved out of the way, permitting the awl to move into the line of drive so as to position the hole or puncture in the work in proper position with respect to the driver. In the operation of the machine therefore the awl and the throat are alternately positioned in the line of drive.

Another object is to support the fastener chute or raceway in such a manner that the nails will be agitated as they move down the chute so as to prevent clogging. This is accomplished by connecting the lower end of the raceway to the throat so as to move therewith when the throat moves into and out of position with respect to the driver.

Another object is to improve the awl feed mechanism whereby it will be simple in construction and operation and susceptible of easy adjustment.

Further objects will appear from the detail description taken in connection with the accompanying drawings in which:

Figure 1 is a side elevation of the upper portion of my improved loose nailing machine with parts thereof in vertical section, Fig. 2 is an elevation of the extreme upper end of the frame of the machine, and showing means employed for moving the driving bar forcibly downward, Fig. 3 is a front elevation of the upper portion of the machine and showing the driving bar and its elevating means, Fig. 4 is a vertical section taken approximately on the line 6—6 of Fig. 1, Fig. 5 is an enlarged detail view partly in section and showing the throat piece and the adjacent end of the nail chute, Fig. 6 is a horizontal section through the nail hopper and showing the upper portion of the nail chute in plan view, and Fig. 7 is a vertical section taken on the line 11—11 of Fig. 6.

Referring to the accompanying drawings, 3 designates a column upon which is mounted a head or casting 4. Journaled in bearings 22 on the casting 4 is a main driving shaft 23. This shaft is provided with a clutch controlled by a clutch rod 21. A horn 7 elevated by a spring (not shown) is depressed by suitable mechanism operated from the main shaft through a rod 15. The clutch and horn actuating mechanisms form no part of this invention and are therefore not described in detail.

51 designates a work engaging plate or presser-foot which is rigidly fixed to and projects forward from the lower portion of the casting 4 immediately above the upper end of the horn 7, and while the machine is in operation the horn presses the work against the under side of this frame. The forward end of a work guide 52 in the form of a horizontally disposed arm occupies a position immediately beneath the plate 51, and to the rear of the upper end of the horn 7, said work guide being adjustably seated in a part of the casting 4.

Formed in the plate 51 is a slot 53 through which projects an awl 54 carried by a horizontally disposed pin 55, which latter is seated in the horizontally disposed arm of a bell crank 56, which forms the awl carrier. This awl carrier is mounted to slide and rock upon a pin 57 seated in the lower portion of the casting 4, and carried by the upper end of the vertical arm of this awl carrier is a pin 58 provided with a sliding collar 59.

The collar 59 is engaged by the bifurcated lower end of a lever 60 which is journaled on a pin 61 projecting from the side of the casting 4 and the upper end of this lever is provided with a pin 62 carrying a cam roll which operates in a cam groove 63, formed in a cam wheel 64 carried by the forward portion of the shaft 23. The cam groove 63 is of such shape as to impart a rocking motion to the lever 60, which rocking motion is imparted to the awl carrier, thus causing the horizontal arm thereof to vibrate vertically, and thus the awl is alternately forced into or through the work and withdrawn therefrom. Simultaneous with this puncturing movement of the awl, the awl carrier 56 is moved laterally by means of a lever 65, the lower end of which embraces the pin 57 and is adapted to engage the awl carrier 56. This lever is fulcrumed between a pair of ears 66 on the casting 4, and the upper end of said lever is provided with a roller 67, which rides on the periphery of a cam 68 formed on the end of the cam wheel 64. When the roller 67 rides on to the high portion of the cam 68 the lever 65 is moved upon its fulcrum so that its lower end is moved inward, thus bearing against and moving the awl carrier 56 inward, and thus the awl is shifted laterally. This movement takes place while the awl is in the work and consequently such operation feeds or moves the work between the horn 7 and plate 51. A set screw 69 passes through the upper portion of the lever 65, and bears against the side of the casting 4, thus providing means for regulating or adjusting the movement of said lever 65.

Arranged to swing upon a pin or screw 70 seated in the front end of the casting 4 is a block or link 71 to the lower portion of which is detachably applied a throat piece 72 forming a throat or nose through which the nails are forced by means of a driver. A spring pressed plug 71ª bears against the side of the block 71 and normally holds the same in a vertical position. Formed in one side of this throat piece is a vertically disposed groove or driver passage 73 through which the nails and driver pass, and formed in the rear side of the lower portion of said throat piece is an undercut shoulder 74 engaged by the part 55 on the awl carrier.

75 designates the driver which is in the form of a small rod of such size as to readily pass through the groove 73, said driver being detachably seated in the lower end of a driver bar 76, in the form of a vertically disposed rod, which is mounted to slide in suitable bearings 77 formed on the front side of the casting 4. Adjustably positioned on the upper portion of this driver bar is a block 78 with which is formed integral a rearwardly projecting lug 79. The forward end of the shaft 23 carries a cam 80 which during the rotation of said shaft 23 engages against the under side of the lug 79, thereby moving the same and the driver bar upward, and after the lug passes off from said cam the elevated parts drop.

Fixed on the upper portion of the driver bar 76 is a disk 81 which when the driver bar is in its lowermost position rests upon the upper one of a series of elastic washers 82, which latter are positioned on the upper one of the bearings 77, and thus provide means for deadening the jar and doing away with the noise incident to the sudden downward movement of the driver bar.

The extreme upper end of the driver bar is positioned beneath the free end of an arm 83, which is pivotally mounted on a bracket projecting upward from the casting 4, and bearing on top of this arm 83 is one end of a stiff spring 84. This spring is so arranged as to oppose the upward movement of the driver bar 76, and cause the same to move downward with considerable force, thus driving the nails as the same are fed into the groove 73 in the throat piece 72.

The picker used for separating or cutting out the nails one at a time, and to transfer said nails from the raceway or chute to the groove 73 in the throat piece comprises a vertically disposed plate 85, which is arranged to slide transversely relative to and between the throat piece 72, and the lower end of the nail chute. The forward end of this picker is bifurcated and said bifurcated portion being knife edged in order that it will readily pass between the nails in the chute. This picker plate 85 is arranged to slide in a housing 88 secured to the chute, and projecting through a slot 89 formed in the side of said housing is a pin 90.

91 designates a vertically arranged lever which is fulcrumed at a point adjacent its center to a pin 92 on the side of the casting 4 immediately in front of the lever 60, and the lower end of this lever engages the pin 90. The upper end of this lever 91 is provided with a roller 93 which bears against a cam face 94 formed on the front face of the disk 64. A spring 95 is arranged on the casting 4, and bears against a projection on the upper portion of the lever 91 for the purpose of maintaining the roller 93 against the cam face 94. The picker 85 is reciprocated by the lever 91 operating through the pin 90.

96 designates the nail chute or raceway which occupies an inclined position in front of the casting 4, said chute being provided with a slot 97 in its upper portion which accommodates the bodies of the nails utilized in my improved machine and during their passage through the chute the heads of the nails rest on top of the chute. The lower end of the chute 96 is detachably and pivotally connected to the lower end of the throat piece 72 by a pin or screw 96ª, and said chute is provided with transversely disposed notches or grooves 98 at its lower end to accommodate the picker 85.

99 designates a cover plate which is positioned immediately over the lower portion of the chute 96, and is for the purpose of preventing the nails in the lower portion of the chute from being forced upward by reason of the weight of the nails in the central and upper portions of the chute.

Formed in the top side of the upper portion of the chute 96 and communicating with the slot therein is a pair of grooves 100 which form a pocket into which the nails are deposited and from which pockets said nails pass into the slot 97. The upper portion of the chute 96 rests loosely upon a horizontally disposed shaft 101, which is journaled in a bracket 102 extending from one side of the casting 4, and fixed on the bracket 102 immediately adjacent the nail chute 96 is a circular housing 103, the upper portion of which is provided with a hopper 104. The shaft 101 passes through the center of the housing 103 and fixed on the forward end of said shaft 101 is a cup-shaped housing or drum 105, which occupies a position immediately in front of the housing 103, thus the housings 103 and 105 combine to form a receptacle for the nails utilized in connection with the machine and in order to elevate the nails and to feed the same into the slot in the nail chute the interior of the housing 105 is provided with a series of blades 106 which during the operation of said housing 105 engage the nails, elevate the same and permit them to drop onto a small chute 107 arranged within the housing 105, and leading to the upper portion of the chute in which the pocket is formed.

The shaft 101 is rotated by means of a pinion 108 fixed on its rear end which pinion meshes with a pinion 109 carried by shaft 110 journaled in the bracket 102 and carried by said shaft 110 is a pulley 111 around which passes a belt 112. This belt is driven from a pulley 113 mounted on the shaft 23.

To prevent the nails from choking the chute, and to throw out any nails which are not properly positioned in said chute I provide a toothed wheel 114 which is arranged immediately above the central portion of said chute. Said toothed wheel being fixed on a shaft 115 journaled in a bearing formed on the bracket 102, and mounted on the rear end of said shaft 115 is a pulley 116. A corresponding pulley 117 is fixed on the shaft 101 and passing around the pulleys 116 and 117 is a belt 118. Thus when the machine is in operation the toothed wheel 114 is rapidly rotated immediately above the slot in the nail chute, and any nails which are not properly positioned in said chute will be thrown back into the nail receptacle. The above forms loading mechanism for loading fasteners into the raceway or chute.

The operation of the machine will now be described.

The raceway or chute is loaded with nails from the loader by the rotation of the drum or housing 105. Since the nail loading mechanism is however of well-known construction, its operation need not be described in detail. Assuming that a piece of work such as a shoe is placed upon the horn 7 and held between the horn and the work plate or presserfoot 51 and against the gage 52, the awl 54 being at this time in raised position and at its right-hand limit (Fig. 3), the throat being under the driver and the driver down, the cycle of operations will be as follows: The awl carrier will first be depressed by its cam 63 to cause the awl to pierce the work, and during this movement of the awl the driver will be raised by its cam clear of the throat. The awl carrier will now be moved to the left (Fig. 3) by its actuating lever 65 and cam 68 until the awl is in alinement with the driver. The awl carrier will now be swung to withdraw the awl from the work, leaving the awl hole in position underneath and in alinement with the driver. During the movement of the awl into alinement with the driver the throat is swung out of the way by the engagement of the awl carrier with the undercut shoulder 74 thereon. After the awl has been retracted from the work the awl carrier is slid back to the right (Fig. 3) by the spring pressed plug 71ª acting through the link 71 and the throat. The throat is also returned with the awl carrier by the spring pressed plug 71ª back into alinement with the driver. The right-hand position of the awl carrier is limited by the engagement of the adjustable stop screw 69 with the machine frame, and this stop screw also limits and locates the right-hand position of the throat so as to properly locate the driver passage in alinement with the driver. The throat being now in alinement with the driver, a nail is fed from the raceway or chute by the picker 85, and the driver is now released by its cam to permit it to descend and drive the nail positioned in the throat. This completes the cycle of operations. It will be understood that the horn is depressed during the feeding movement of the awl and is released to clamp the work against the presserfoot 51 during the return movement of the awl carrier and during the driving of the nail. It will thus be seen that the throat is moved into and out of the line of drive so as to permit the awl to move into the line of drive and properly position the awl hole for the reception of the fastener. The throat is moved in one direction through the awl carrier engaging the undercut shoulder 74, while both the throat and awl carrier are returned by the spring pressed plug 71ª. The movement of the throat when in alinement with the driver is arrested by the adjustable stop 69, the adjustment of which enables accurate alinement of the throat. The moving part of the fastener inserting mechanism is of light construction, since it consists merely of a light plate 71 and a light throat-piece 72. The inertia will therefore be small and the vibration and wear will be reduced to a minimum. The fastener chute slides in the loader in the direction of its length, and this movement will facilitate the movement of the fasteners down the chute to the driver passage in the throat. The linkage suspension of the throat and the lower end of the chute by means of the pivotal connections 70 and 96ª permits easy sliding movement of the chute on the shaft 101. The parts are so constructed that they can be accurately adjusted and alined.

It is obvious that various changes may be made in the details of construction without departing from this invention, and it is therefore to be understood that this invention is not to be limited to the specific construction shown and described.

I claim:

1. In a machine of the class described, the combination of a frame, a nail guiding throat mounted thereon to swing in a vertical plane, yielding pressure means for holding the throat in normal position, a driver operating through said throat, and an independently mounted awl adapted to move vertically and laterally, and which awl engages the work and moves the same beneath the throat.

2. In a machine of the class described, the combination with a frame and a driver thereon, of a plate pivoted at its upper end to said frame and provided at its lower end with an elongated driver passage adapted to receive said driver therein and guide a nail while being driven by said driver, and means for moving said plate to move said driver passage into and out of alinement with the driver.

3. In a machine of the class described, the combination with a frame and a driver thereon, of a plate pivoted at its upper end to said frame and having a nail guiding throat at its lower end, said plate being adapted to swing to move the throat into and out of alinement with the driver, and a spring pressed plunger engaging said plate to move it.

4. In a machine of the class described, the combination with a frame and a driver thereon, of a plate pivoted at its upper end to said frame and having a nail guiding throat at its lower end, awl mechanism including an awl carrier adapted to move said plate with the throat out of alinement with the driver, and means engaging said plate for returning said plate with the throat into alinement with the driver.

5. In a machine of the class described, the combination of a frame, a member arranged to swing thereon, a throat piece detachably applied to said swinging member, there being a nail groove formed through said throat piece, independently mounted means for feeding the work beneath the throat piece, driving means operating through the nail groove, and a nail chute connected to the throat piece.

6. In a machine of the class described, the combination of a fixed frame, a spring pressed plate arranged to swing on said frame, a throat piece detachably applied to said plate, there being a nail receiving groove formed in said throat piece, nail driving means operating through said groove, and means whereby a nail is delivered to the nail groove while the driving means is withdrawn therefrom.

7. In a machine of the class described, the combination of a fixed frame, a spring pressed plate arranged to swing on said frame, a throat piece detachably applied to said plate, there being a nail receiving groove formed in said throat piece, nail driving means operating through said groove, means whereby a nail is deliverd to the nail groove while the driving means is withdrawn therefrom, and independently mounted adjustable means for feeding the work beneath the lower end of the throat piece.

8. In a machine of the class described, the combination of a work support, a swinging throat piece above the work support, a vertically and laterally moving awl carrier independently mounted and arranged for operation above the support and adapted to bear against the throat piece and swing the same laterally relative to the support, and a nail driver operating through the throat piece.

9. In a machine of the class described, the combination of a work support, a swinging throat piece above the work support, a vertically and laterally moving awl carrier independently mounted and arranged for operation above the support and adapted to bear against the throat piece and swing the same laterally relative to the support, a nail driver operating through an elongated nail groove formed in the throat piece, and a nail chute leading to the nail groove in the throat piece.

10. In a machine of the class described, the combination of a work support, a swinging throat piece above the work support, a vertically and laterally moving awl carrier arranged for operation above the support and adapted to bear against the throat piece and swing the same laterally relative to the support, a nail driver operating through the throat piece, a nail chute leading to the throat piece, and means for feeding the nails one at a time from the chute into the throat piece.

11. In a machine of the class described, the combination of a swinging throat piece, in the side face of which is formed a nail receiving groove, a driver arranged to move through said groove, means whereby nails are delivered one at a time to said groove in the path of travel of the driver, and a work feeding member for engaging and feeding the work beneath the throat piece, and which work feeding member engages the throat piece to swing the same out of the way during a portion of the work feeding movement.

12. In a machine of the class described, the combination with a frame, and a driver and a nail loader thereon, of a throat mounted for movement into and out of alinement with the driver, a chute connected to said throat and movable lengthwise in said loader, and means for moving said throat and chute.

13. In a machine of the class described, the combination with a frame, and a loader and a driver thereon, of a chute movable in said loader and having a throat connected thereto, and a linkage connection supporting said chute and throat for transverse movement on said frame with respect to the driver.

14. In a machine of the class described, the combination with a frame, and a driver and a nail loader thereon, of a throat mounted for movement into and out of alinement with the driver, a chute connected to said throat and movable lengthwise in said loader, independently mounted awl mechanism, and means for moving said throat and chute and said awl mechanism.

15. In a machine of the class described, the combination with a frame and a driver thereon, of a throat mounted on said frame for movement in the line of feed of the work, a fastener chute movable with said throat and provided with means to feed loose fasteners to the driver, independently supported awl mechanism, and means for moving said awl mechanism in the line of feed of the work.

16. In a machine of the class described, the combination with a frame and a driver thereon, of a throat mounted on said frame for movement in the line of feed of the work, a fastener chute movable lengthwise and with said throat, awl mechanism, and means for moving said awl mechanism in the line of feed, said awl mechanism engaging and moving said throat.

17. In a machine of the class described, the combination with a frame and a driver thereon, of a throat mounted on said frame for movement in the line of feed of the work, a source of cut fastener supply, means for feeding fasteners from said supply to said throat, independently mounted awl mechanism including an awl movable in the line of feed, and operating means constructed to move said awl and throat alternately under the driver.

18. In a machine of the class described, the combination with a frame and a driver thereon, of a throat mounted on said frame for movement thereon, awl mechanism including an awl carrier, operating means constructed to cause the awl carrier to engage and move the throat in one direction, and means for moving the throat in the opposite direction.

19. In a machine of the class described, the combination with a frame and a driver thereon, of a throat mounted on said frame for movement thereon, awl mechanism including an awl carrier, operating means constructed to cause the awl carrier to move the throat in one direction, and a spring for moving the throat in the opposite direction.

20. In a machine of the class described, the combination with a frame, and a driver and a nail loader thereon, of a throat mounted for transverse movement on said frame, a chute movable with said throat and in said loader, and means for moving said throat into and out of alinement with the driver.

21. In a machine of the class described, the combination with a frame and a driver thereon, of a throat mounted for transverse movement on said frame, a chute movable lengthwise and with said throat, and means for moving said throat into and out of alinement with said driver.

22. In a machine of the class described, the combination with a frame and a driver thereon, of a chute having a throat connected thereto, means for supporting said chute and throat for transverse movement on said frame in a vertical plane, and means 23. In a machine of the class described, the combination with a frame and a driver thereon, of a chute having a throat connected thereto, a link for supporting said chute on said frame, and means for operating said chute and throat to move the throat into and out of alinement with said driver.

24. In a machine of the class described, the combination with a frame and a driver thereon, of a chute movable on said frame, a throat pivoted to said chute and means for supporting said throat for transverse movement on said frame.

25. In a machine of the class described, the combination with a frame and a driver thereon, of a chute movable on said frame, a throat jointed to said chute and to said frame, and means for moving said throat and chute transversely on said frame.

26. In a machine of the class described, the combination with a frame, and a loader and driver thereon, of a chute guided for movement in said loader, a throat connected to the lower end of said chute, and means for supporting the lower end of said chute for transverse movement on said frame with respect to the driver.

27. In a machine of the class described, the combination with a frame, and a shaft and a driver actuated thereby both mounted on said frame, of a member pivoted on said frame at a point below said shaft and in line with said driver to swing transversely with respect to said shaft and driver, said member being provided with an elongated driver passage adapted to receive the driver therein and guide a nail while driven by said driver, and means for swinging said member to move said driver passage into and out of alinement with said driver.

28. In a machine of the class described, the combination with a frame and a driver thereon, of a throat movably mounted on said frame, said throat having an undercut shoulder, and awl mechanism adapted to engage said shoulder and move said throat transversely with respect to the driver.

29. In a machine of the class described, the combination with a support, of awl mechanism including an awl carrier, a bearing on said support for said carrier adapted to permit said carrier to swing thereon to pierce the work and slide thereon to feed the work, and means for swinging said awl carrier positively in both directions.

30. In a machine of the class described, the combination with a frame, and a driver and a transversely movable throat thereon, of awl mechanism including an awl carrier mounted to swing and slide on said frame, and means for operating said carrier in the line of feed, said carrier engaging and moving said throat.

31. In a machine of the class described, the combination with a frame, and a driver and a transversely movable throat thereon, of awl mechanism including an awl carrier pivotally and slidingly supported rearwardly of said throat, and means for sliding said carrier to feed the work and engage and move said throat.

32. In a machine of the class described, the combination with a frame, and a driver and a transversely movable throat thereon, of awl mechanism including an awl carrier mounted to swing and slide on said frame, means for operating said carrier in the line of feed, said carrier engaging and moving said throat, and a spring for returning said throat and awl.

In testimony whereof I hereunto affix my signature in the presence of two witnesses, this 16th day of April, 1910.

JOHN B. FLINT.

Witnesses:
W. K. AMICK.
H. L. WALKER.